United States Patent [19]

Knappe et al.

[11] Patent Number: 4,899,608
[45] Date of Patent: Feb. 13, 1990

[54] GEAR ARRANGEMENT, IN PARTICULAR FOR USE IN CONNECTION WITH MOTOR VEHICLE WINDOW LIFTER DRIVES

[75] Inventors: Wolfram Knappe; Alfred Kümmel, both of Kitzingen, Fed. Rep. of Germany

[73] Assignee: Siemens Aktiengesellschaft, Berlin and Munich, Fed. Rep. of Germany

[21] Appl. No.: 98,493

[22] Filed: Sep. 18, 1987

[30] Foreign Application Priority Data

Sep. 24, 1986 [DE]  Fed. Rep. of Germany ....... 3632501

[51] Int. Cl.[4] .................. F16D 3/68; F16H 55/14; E05F 11/38
[52] U.S. Cl. .................................. 74/411; 49/349; 74/425; 464/73
[58] Field of Search .................... 49/349; 74/411, 425; 464/73, 93

[56] References Cited

U.S. PATENT DOCUMENTS 4,367,660  1/1983  Becker et al. ...................... 74/411 X
4,643,040  2/1987  Adam et al. .......................... 74/425

FOREIGN PATENT DOCUMENTS 2706034  8/1978  Fed. Rep. of Germany ........ 464/73
2952408  7/1981  Fed. Rep. of Germany .
8427394  5/1985  Fed. Rep. of Germany .
3403259  8/1985  Fed. Rep. of Germany .
3438254  4/1986  Fed. Rep. of Germany ........ 49/349
2457421  12/1980  France .
59-65664  4/1984  Japan ..................................... 74/411

Primary Examiner—Allan D. Herrmann
Attorney, Agent, or Firm—Kenyon & Kenyon

[57] ABSTRACT

In a gear arrangement whose output shaft (5) is rotatably mounted in a gear box (6) and which corotates by means of a dog plate (3) via an axially interposed cushioning disk (2) with a gear (4) driven by a worm shaft (7) and, further, which output shaft is axially supported directly and/or indirectly, via the cushioning disk (2) and the gear (4), by the gear box (6), it is intended to provide, despite design related axial length tolerances, a tolerance play compensation in a manner which is considerably simplified from a production and assembly engineering viewpoint. Towards this end, the elastic cushioning disk (2) is provided with axially projecting spring lips (21 to 23), distributed over its circumference, for the development of a defined preloading pressure upon the components supported by the gear box (6).

8 Claims, 2 Drawing Sheets

TO MOTOR VEHICLE WINDOW LIFTER DRIVE

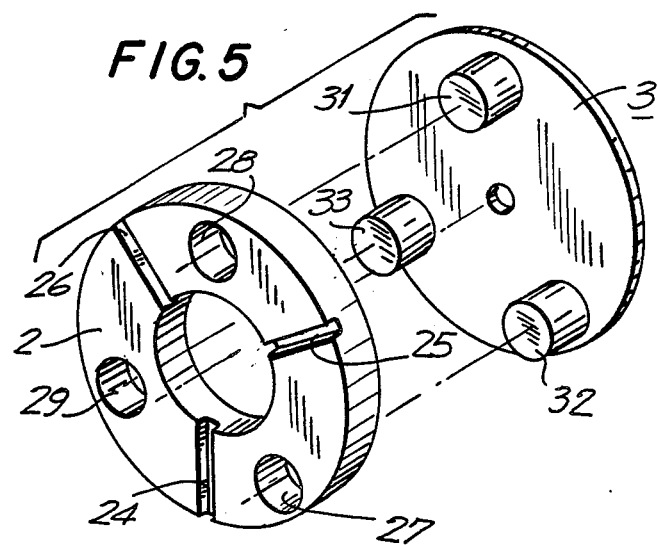
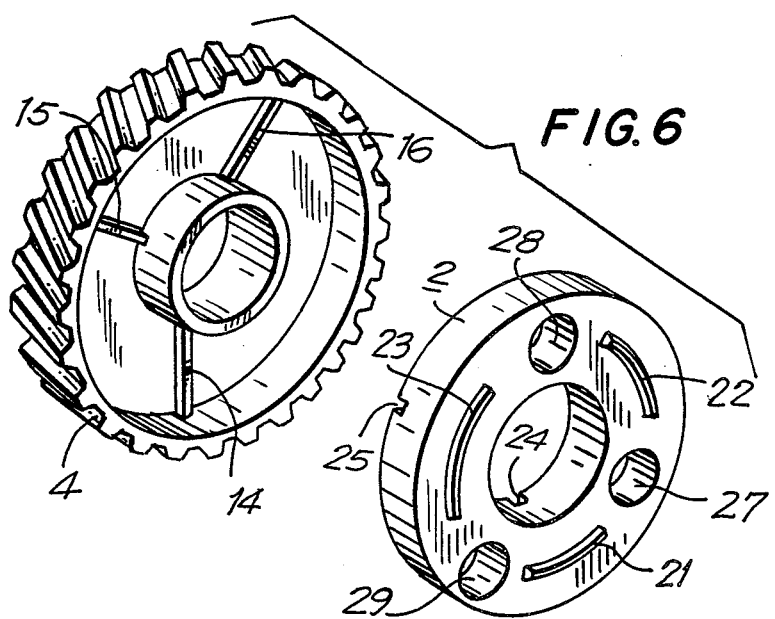

# GEAR ARRANGEMENT, IN PARTICULAR FOR USE IN CONNECTION WITH MOTOR VEHICLE WINDOW LIFTER DRIVES

BACKGROUND AND SUMMARY OF THE INVENTION

The invention relates to a gear arrangement, and in particular, to a gear arrangement for use in connection with motor vehicle window lifter drives.

In the worm gear arrangement known from DE-GM 84 27 394 and used in a motor vehicle window lifter drive, the window pane is driven at full force into its "window closed" and "window open" end positions by the drive motor. To cushion the shock loads acting upon the motor and the other drive assembly components during this process, a rubber cushioning disk is inserted between the gear driven by the motor shaft via a worm and mounted in the gear box and an axially preceding dog plate coupled to the output shaft. The rubber cushioning disk absorbs the shock in the radial and tangential directions when the motor arrives in the above described end positions.

The output shaft is rotatably mounted in the gear box and supported in one axial direction by an output pinion and in the other axial direction by the dog plate. The other components of the cushioning disk and the gear arrangement sit on the output shaft in the gear box. Due to the tolerances of the parts of the assembled components, in each individual case care must be taken during assembly that, on the one hand, axial jamming and operating stiffness are avoided at maximum plus tolerances and, on the other hand, vibratory and running noises are avoided at maximum minus tolerances. In the known case one has attempted, therefore, to provide tolerance compensation by the interposition of appropriate shims or Belleville washers, depending on the total tolerance measured first in each individual case.

It is an object of the present invention to be able to produce the components with the tolerances usual for mass production and assure, despite simple, especially readily automated, assembly, great functional reliability and long life of the gear arrangement, particularly taking into account the wide operating temperature differences given in a window lifter drive application.

The object of the invention is achieved in a gear arrangement of the above described type wherein the output shaft is rotatably mounted in a gear box and co-rotates via an axially interposed elastic cushioning disk with a gear driven by a drive shaft. The output shaft is supported directly or indirectly by the gear box by means of the cushioning disk. A predefined preloading pressure upon the components of the gear arrangement is provided by axially projecting spring lips distributed circumferentially over the surface of the elastic cushioning disk.

Due to the cushioning element design according to the invention, it is possible to eliminate the manufacturing steps of having to measure separately the cumulative tolerance in each individual case and having to insert separately one or more shims or Belleville washers because, on the one hand, the spring lips can be made to be an integral part of the cushioning disk and are, therefore, assembled with the latter and, on the other hand, if the axial pressure remains approximately the same, the different axial tolerances can be compensated through the deformation of the spring lips when assembling those components which are to be under a defined preload. On the one hand, the compression or squeeze generated when mutually bracing the components axially against the gear box due to the deformation of the spring lips is so great that sufficient axial bracing of the parts is still assursed at maximum tolerance play and, on the other hand, if the resultant play is minimal, the compression of the assembled parts is not yet so great that it becomes difficult for the motor drive to turn the parts it is designed to drive or that jamming of these parts occurs.

By changing the axial height, the profile and/or the distribution of the spring lips on the one face of the cushioning disk it is possible to adapt, in a simple manner, to different designs or preloads. If the spring lips are arranged so as to extend tangentially, especially near the outer peripheral surface of the cushioning disk, it is additionally possible in an advantageous manner, to prevent tilting of the gear, which is rotatably mounted on the output shaft with relatively large radial play to take into account the great operating temperature differences. This is due to the fact that the spring lip support is located far on the outside of the dog plate of the gear arrangement, thus assuring optimal engagement of the worm shaft driving the gear while keeping friction and wear low.

The invention and further advantageous embodiments of the invention are explained below in greater detail with reference to an exemplary embodiment depicted schematically in the drawings.

BRIEF DESCRIPTION OF THE DRAWINGS

FIG. 5 is an exploded perspective view of the dog and cushioning disc of FIG. 2.

FIG. 6 is an exploded perspective view of the cushioning disc and gear of FIG. 2.

DETAILED DESCRIPTION

Figure 1:
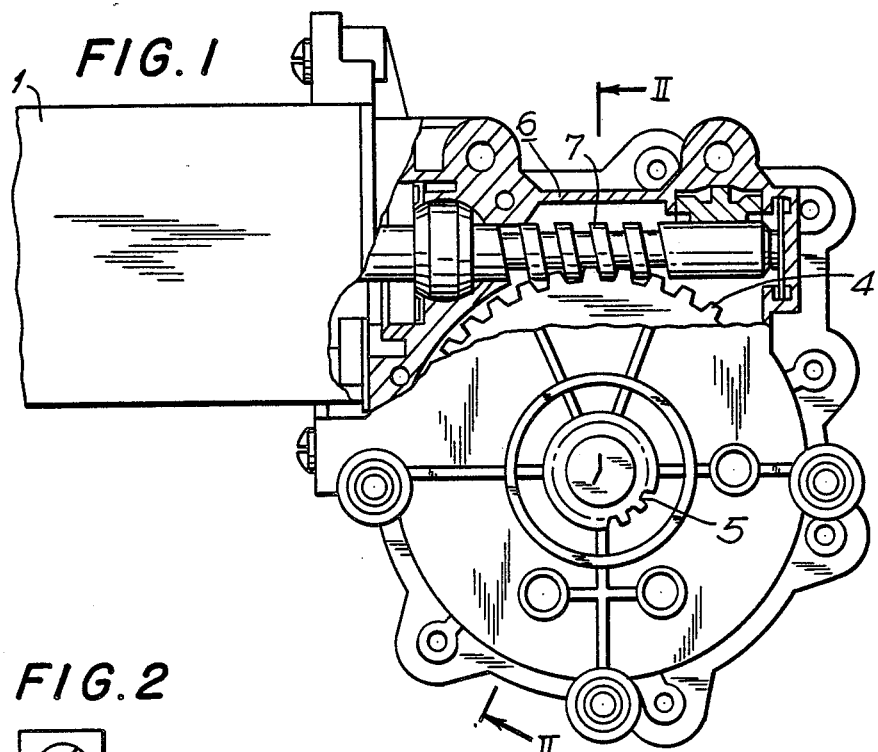
FIG. 1 illustrates a motor vehicle window lifter drive in an axial longitudinal section.

Referring now to the drawings, and initially to FIG. 1 there is illustrated, in an axial, longitudinal part section, a motor vehicle window lifter drive with a commutator motor 1, indicated schematically only, whose extended rotor shaft protrudes as a worm shaft 7 into a potshaped gear box 6 flanged to the housing of the commutator motor 1 and closable by a gear box cover 61. The worm shaft 7 drives a gear 4 rotatably mounted to an output shaft 5.

Through a cushioning disk 2, the gear is caused to corotate with the dog plate 3 which, in turn, is connected to shaft 5. The cushioning disk 2 may be made from rubber. As a drive connection between gear 4 and dog plate 3, the gear 4 has, distributed over the circumference, three radially extending, axially projecting drive fins 14 to 16 which engage corresponding, axial, first drive openings 24 to 26 provided in the cushioning disk 2 surface on the gear side. For corotation of the cushioning element 2 and the axially preceding dog plate 3 there are provided on the dog plate 3 axially projecting drive fins 31 to 33 in the form of basses which are oriented towards the cushioning disk 2, only one drive fin 31 being visible in FIG. 2. The drive fins 31 to 33 of the dog plate 3 engage corresponding second drive openings 27 to 29 of the cushioning disk 2.

Figure 2:
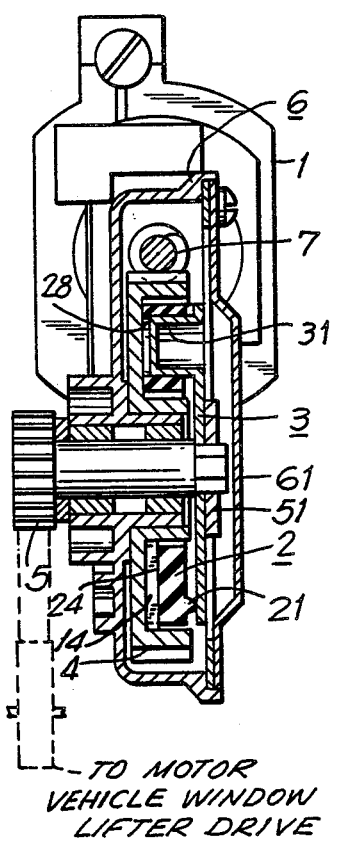
FIG. 2 illustrates a transverse section of the gear box of the motor vehicle window lifter drive shown in FIG. 1, along line II—II.
Figure 3:
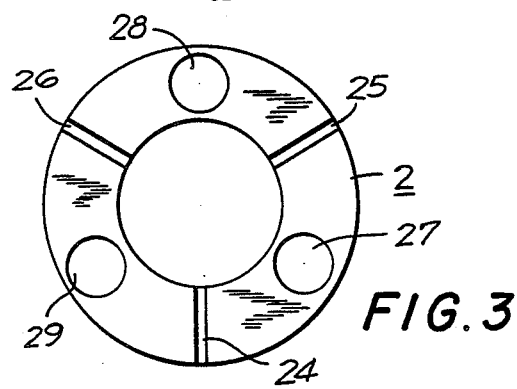
FIG. 3 is a top view of the cushioning disk surface facing the gear.

When assembling the gearing arrangement, the output shaft 5 is introduced from the left into the gear box 6, according to FIG. 2; then the gear 4, the cushioning disk 2 and the dog plate 3 are put on the right end of the output shaft 5 and the entire assembly, axially preloaded by compressing the spring lips 21 to 23, is fixed by providing a lock washer 51 to secure the dog plate 3 to the right end of the output shaft 5 in such a manner that, at its left end, the output shaft 5 supports itself via the left output pinion against the left outside wall of the gear box 6 and, at its right end via the dog plate 3, the cushioning disk 2 and the gear 4 on the left inside wall of the gear box 6.

Figure 4:
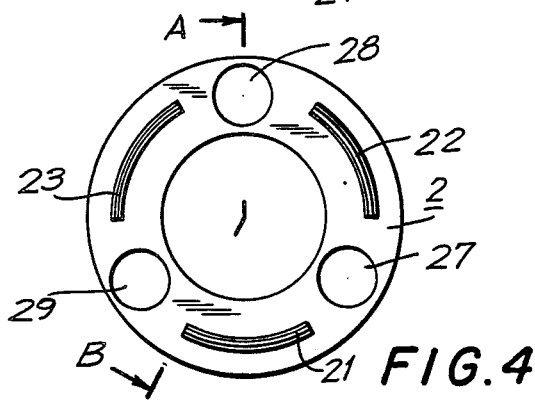
FIG. 4 is a top view of the cushioning disk surface facing the dog plate.

To explain the invention, FIG. 4 and the lower part of FIG. 2 is referred to in particular which shows the assembled cushioning disk 2 according to FIG. 4 in the view according to section A-B.

For length tolerance compensation according to the invention, there are, injection molded integrally to the cushioning disk 2 surface on the dog plate side, three tangentially extending, mutually spaced spring lips 21 to 23 which are distributed over the outer periphery and are axially compressable more or less, depending on the total tolerance present in the individual case, when the bracing gear 4, dog plate 3 and cushioning disk 2 are compressed axially against each other. In the exemplary embodiment shown, the spring lips taper down towards their axially free front edges and extend tangentially and circumferentially over an angle of approximately 60°. But other cross-sectional designs more suitable for the individual case may also be provided in adaptation to the individual contingencies. Advantageous lip shapes are e.g. arcs, straight lips in radial, axial or star arrangement, round or ovals nubs of cylindrical or conical section. The configuration of the spring lips on the surface of the cushioning disks may also be adapted optimally by distributing them e.g. centrally or more or less eccentrically towards the outside diameter.

What is claimed is:

1. In a gear arrangement for use in connection with a motor vehicle window lifter drive and including an output shaft rotatably mounted in a gear box and arranged to corotate by means of an axially interposed cushioning disk with a drive gear driven by a driveshaft; said gear box and said cushioning disk providing axial support for said output shaft; and improvement, which comprises: axially projecting spring lips distributed over the circumference of said cushioning disk and acting to develop a defined preloading pressure upon said output shaft, cushioning disk and drive gear; wherein said spring lips extend tangentially on the cushioning disk.

2. The gear arrangement of claim 1, wherein said spring lips are molded integrally to the cushioning disk.

3. The gear arrangement of claim 1, wherein said cushioning disk is made from rubber.

4. The gear arrangement of claim 1, wherein said spring lips are disposed toward the outer periphery of said cushioning disk.

5. The gear arrangement of claim 1, wherein:
   (a) said cushioning disk includes a first surface disposed opposite said drive gear and a second surface disposed opposite a dog plate;
   (b) a first set of axial drive openings formed on said first surface and engaged by corresponding axial drive fins formed on said drive gear;
   (c) a second set of axial drive openings formed on said second surface and engaged by corresponding axial drive fins formed on said dog plate.

6. In a gear arrangement for use in connection with a motor vehicle window lifter drive and including an output shaft rotatably mounted in a gear box and arranged to corotate by means of an axially interposed cushioning disk with a drive gear driven by a driveshaft; said gear box and said cushioning disk providing axial support for said output shaft; an improvement, which comprises: axially projecting spring lips distributed over the circumference of said cushioning disk and acting to develop a defined preloading pressure upon said output shaft, cushioning disk and drive gear; and wherein:
   (a) said cushioning disk includes a first surface disposed opposite said drive gear and a second surface disposed opposite a dog plate;
   (b) a first set of axial drive openings formed on said first surface and engaged by corresponding axial drive fins formed on said drive gear;
   (c) a second set of axial drive openings formed on said second surface and engaged by corresponding axial drive fins formed on said dog plate; and
   (d) said spring lips are disposed in the spaces between individual ones of said second set of axial drive oenings.

7. The gear arrangement of either of claims 1 or 6, and further an electric motor including a worm gear output drive mechanically coupled to said drive gear.

8. The gear arrangement of claim 7 wherein said output shaft is mechanically coupled to a motor vehicle window lifter drive.

* * * * *